United States Patent
An et al.

(10) Patent No.: US 10,193,140 B2
(45) Date of Patent: Jan. 29, 2019

(54) POSITIVE ACTIVE MATERIAL FOR RECHARGEABLE LITHIUM BATTERY AND RECHARGEABLE LITHIUM BATTERY

(75) Inventors: Jung-Woo An, Yongin-si (KR); Kyeu-Yoon Sheem, Yongin-si (KR); Sumihito Ishida, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/597,214

(22) Filed: Aug. 28, 2012

(65) Prior Publication Data

US 2013/0288114 A1    Oct. 31, 2013

(30) Foreign Application Priority Data

Apr. 30, 2012   (KR) .................. 10-2012-0045479

(51) Int. Cl.

| | |
|---|---|
| *H01M 4/00* | (2006.01) |
| *H01M 4/36* | (2006.01) |
| *H01M 4/583* | (2010.01) |
| *H01M 4/587* | (2010.01) |
| *H01M 10/0525* | (2010.01) |
| *H01M 4/525* | (2010.01) |
| *H01M 4/02* | (2006.01) |

(52) U.S. Cl.
CPC ........... *H01M 4/364* (2013.01); *H01M 4/583* (2013.01); *H01M 4/587* (2013.01); *H01M 10/0525* (2013.01); *H01M 4/525* (2013.01); *H01M 2004/021* (2013.01)

(58) Field of Classification Search
CPC .. H01M 4/364; H01M 10/0525; H01M 4/587; H01M 2004/021; H01M 4/525
See application file for complete search history.

(56) References Cited

U.S. PATENT DOCUMENTS

| | | |
|---|---|---|
| 2011/0206998 A1 | 8/2011 | Song et al. |
| 2011/0274973 A1 | 11/2011 | Sheem et al. |
| 2012/0196181 A1* | 8/2012 | Ishida et al. ................. 429/211 |

FOREIGN PATENT DOCUMENTS

| | | |
|---|---|---|
| CN | 102237523 A | 11/2011 |
| EP | 2 385 574 A2 | 11/2011 |
| JP | 2003-077458 | 3/2003 |
| JP | 2003-234099 A | 8/2003 |
| JP | 2004-103546 | 4/2004 |
| JP | 2007-317582 A | 12/2007 |
| JP | 4461685 B2 | 2/2010 |
| JP | 2012-28177 A | 2/2012 |
| KR | 10-2007-0059718 | 6/2007 |

(Continued)

OTHER PUBLICATIONS

Hong et al. "Effect of carbon additive on electrochemical performance of LiCoO 2 composite cathodes" Journal of Power Sources, vol. 111, Issue 1, p. 90-96.*

(Continued)

*Primary Examiner* — Nicholas P D'Aniello
(74) *Attorney, Agent, or Firm* — Lewsi Roca Rothgerber Christie LLP

(57) ABSTRACT

A positive electrode for a rechargeable lithium battery includes a positive active material and activated carbon, wherein an average particle diameter of the activated carbon is about 100% to about 160% relative to 100% of an average particle diameter of the positive active material.

15 Claims, 1 Drawing Sheet

(56) References Cited

FOREIGN PATENT DOCUMENTS

| KR | 10-2008-0029479 A | 4/2008 |
|---|---|---|
| KR | 10-2011-0097459 | 8/2011 |
| KR | 10-2011-0123096 | 11/2011 |

OTHER PUBLICATIONS

Machine translation of Kim, KR 2007-0059718—obtained Jan. 25, 2018 (Year: 2007).*
English Translation of JP 2003-077458 dated Mar. 14, 2003, 9 pages.
EPO Search Report dated May 13, 2013, for corresponding European Patent application 13152117.1, (7 pages).
Patent Abstracts of Japan, and English machine translation of Japanese Publication 2004-103546 dated Apr. 2, 2004, (16 pages).
Kamarulzaman, N., et al. *Influence of carbon additives on cathode materials, $LiCoO_2$ and $LiMn_2O_4$.*, Advancement of Materials Research, vol. 545, Nov. 29-Dec. 1, 2010, pp. 214-219, XP-002695702.
Pasquier, A.D., et al *Power-ion battery: bridging the gap between Li-ion battery and supercapacitor chemistries,* Journal of Power Sources, vol. 136, Sep. 10, 2004, pp. 160-170, XP-4544528.
Zhang Q., et al. *Effect of mesoporous carbon containing binary conductive additives in lithium ion batteries on the electrochemical performance of the $LiCoO_2$ composite cathodes,* Solid State Ionics, vol. 180, May 29, 2009, pp. 698-702, XP-26097611.
Kim, I.J., et al. *Electrochemical Performance of Activated Carbon Electrode Added With $LicoO_2$ for Hybrid Capacitor,* Solid State Phenomena, vol. 124-126, (2007), pp. 947-950, XP-002695703.
Zhang, S., et al. *Research on Lithium Ion Battery Material $LiCoO_2$ for Hybrid Supercapacitor,* Advanced Materials Research, vol. 287-290, (2011), pp. 1565-1568, XP-002695704.
SIPO Office action dated Mar. 22, 2016, for corresponding Chinese Patent application 201210511379.3, (6 pages).
KIPO Office action dated May 17, 2016, for Korean priority Patent application 10-2012-0045479, (4 pages).
English machine translation of Japanese Patent 4461685 B2 issued Feb. 26, 2010, listed above, (20 pages).
KIPO Notice of Allowance dated Jan. 23, 2017, for corresponding Korean Patent Application No. 10-2012-0045479 (5 pages).
JPO Office Action dated Oct. 4, 2016, for corresponding Japanese Patent Application No. 2012-276642 (3 pages).
SIPO Office Action dated Nov. 10, 2016, with English translation, for corresponding Chinese Patent Application No. 201210511379.3 (10 pages).
EPO Office Action dated Aug. 29, 2017, for corresponding European Patent Application No. 13152117.1 (5 pages).
SIPO Office Action, with English translation, dated Apr. 17, 2017, for corresponding Chinese Patent Application No. 201210511379.3 (17 pages).

* cited by examiner

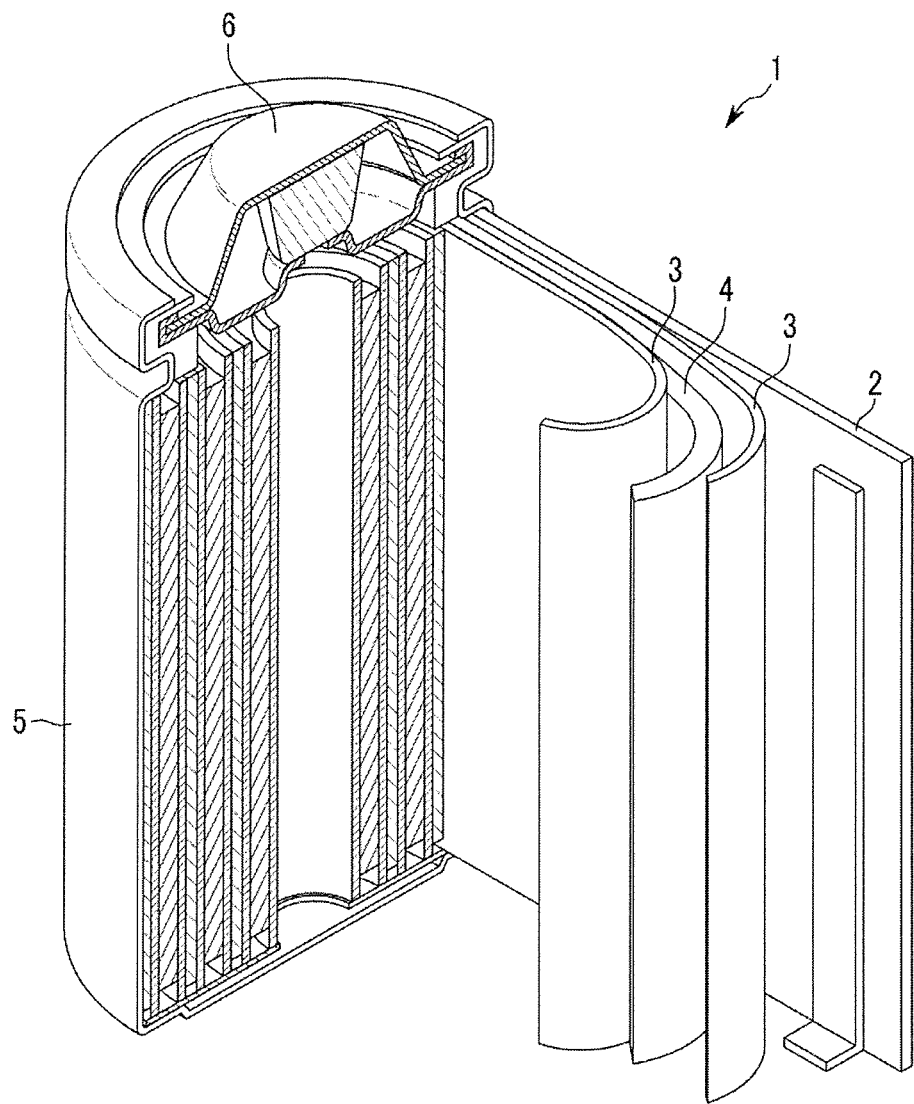

POSITIVE ACTIVE MATERIAL FOR RECHARGEABLE LITHIUM BATTERY AND RECHARGEABLE LITHIUM BATTERY

CROSS-REFERENCE TO RELATED APPLICATION

This application claims priority to and the benefit of Korean Patent Application No. 10-2012-0045479 filed in the Korean Intellectual Property Office on Apr. 30, 2012, the entire contents of which are incorporated herein by reference.

BACKGROUND

1. Field

A positive electrode for a rechargeable lithium battery and a rechargeable lithium battery including the same are disclosed.

2. Description of the Related Art

In recent times, due to reductions in size and weight of portable electronic equipments, and popularization of portable electronic devices, researches on rechargeable lithium batteries having high energy density as power sources for portable electronic devices have been actively made. Rechargeable lithium batteries include a negative electrode, a positive electrode, and an electrolyte, and generate electrical energy by oxidation and reduction reactions when lithium ions are intercalated/deintercalated in the positive electrode and negative electrode. Such rechargeable lithium batteries use a lithium metal, a carbon-based material, Si, and the like for a negative active material. For a positive active material of rechargeable lithium batteries, metal chalcogenide compounds being capable of intercalating and deintercalating lithium ions, and for example, composite metal oxide such as $LiCoO_2$, $LiMn_2O_4$, $LiNiO_2$, $LiNi_{1-x}Co_xO_2$ (0<X<1), $LiMnO_2$, and the like has been used. Recently, an attempt has been made to obtain low resistance by making an electrode into a thin film and thus, to accomplish high power characteristics of a rechargeable lithium battery. However, such electrodes are not satisfactory yet due to the characteristics of the active material itself.

SUMMARY

One or more aspects of embodiments of the present invention are directed toward a positive electrode for a rechargeable lithium battery having excellent high-rate capability and cycle-life characteristics.

Another aspect of an embodiment of the present invention is directed toward a rechargeable lithium battery including the positive electrode.

According to one embodiment of the present invention, a positive electrode for a rechargeable lithium battery includes a positive active material and activated carbon having an average particle diameter in a range of about 100% to about 160% relative to 100% of an average particle diameter of the positive active material.

The average particle diameter of the activated carbon may be in a range of about 100% to about 140% relative to 100% of the average particle diameter of the positive active material.

The positive active material and activated carbon may be present in a mixed ratio in a range of about 98:2 to about 60:40. For example, the positive active material and activated carbon may be present in a mixed ratio in a range of about 94:6 to about 69:31.

The average particle diameter of the activated carbon may be in a range of about 1 μm to about 32 μm. For example, the average particle diameter of the activated carbon may be in a range of about 1 μm to about 30 μm.

The positive electrode may further include a conductive material and a binder.

According to another embodiment of the present invention, provided is a rechargeable lithium battery that includes a positive electrode including a positive active material and activated carbon having an average particle diameter in a range of about 100% to about 160% relative to 100% of an average particle diameter of the positive active material; a negative electrode including a negative active material; and an electrolyte including an organic solvent and a lithium salt. The negative active material may be amorphous carbon.

One or more aspects of embodiments of the present invention are directed toward a positive electrode including activated carbon having an average particle diameter that is the same as or larger than that of a positive active material and, thus, may provide a battery having excellent high rate charge and discharge and cycle-life characteristics.

BRIEF DESCRIPTION OF THE DRAWING

The accompanying drawing, together with the specification, illustrates an exemplary embodiment of the present invention, and, together with the description, serves to explain principles of the present invention.

Here, the accompanying drawing is a schematic view showing a rechargeable lithium battery according to one embodiment.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when a first element is referred to as being "on" a second element, it can be directly on the second element or be indirectly on the second element with one or more intervening elements interposed therebetween. Like reference numerals designate like elements throughout the specification.

A positive electrode according to one embodiment of the present invention includes a positive active material and activated carbon. The positive active material may include positive active material particles. In one embodiment, an average particle diameter of the activated carbon is in a range of about 100% to about 160%, and specifically about 100% to about 140%, relative to 100% of an average particle diameter of the positive active material.

According to one embodiment of the present invention, the positive electrode includes activated carbon having an average particle diameter (e.g., average particle size) that is same as or a maximum of 60% larger than the average particle diameter (e.g., average particle size) of the positive active material, and the positive electrode may be fabricated to be uniform, since the activated carbon is uniformly dispersed with the active material. In addition, the uniform electrode may suppress or reduce the partial degradation of the electrode otherwise due to repeated charge and discharge (e.g., high rate input and output) thereby improving cycle life characteristic. If activated carbon having a smaller particle diameter (e.g., smaller average particle diameter)

than that of the positive active material is used, the activated carbon may have a larger contact area with the positive active material but have less beneficial effect because of the dispersion characteristic of the additive (e.g., the activated carbon) is included in a small amount (e.g., the dispersion characteristics are poor). In particular, the effect may be more deteriorated or reduced during high rate charge and discharge, resultantly deteriorating high rate charge and discharge efficiency and cycle life characteristic.

In addition, the effect of the activated carbon, e.g., physical adsorption of lithium ions and rapid delivery of the lithium ions to the positive active material, may be increased when used in a positive electrode rather than a negative electrode. In particular, the positive electrode has a better activated carbon effect during high rate charge and discharge and, thus, may improve high rate charge and discharge efficiency and cycle life characteristics of a rechargeable lithium battery.

In one embodiment of the present invention, the average particle diameter of the activated carbon is in a range of about 1 μm to about 32 μm. For example, the average particle diameter of the activated carbon may be in a range of about 1 μm to about 30 μm. In another embodiment, the average particle diameter of the positive active material is in a range of about 1 μm to about 20 μm.

The positive active material and activated carbon may be present in a mixed ratio (e.g., weight ratio) in a range of about 98 wt %:2 wt % to about 60 wt %:40 wt %, and specifically about 94 wt %:6 wt % to about 69 wt %:31 wt %.

When the activated carbon is mixed with the positive active material at a ratio (e.g., weight ratio) outside of the above mixing ratio, for example, by including the activated carbon present in an amount greater than about 40% relative to the positive active material, the activated carbon, which has a lower density than the active material, may increase the resistance.

In addition, as the amount of the activated carbon included in the positive electrode is increased, the amount of the positive active material included in the positive electrode is decreased, resultantly decreasing battery capacity. Furthermore, since the activated carbon has high hardness and thus, may lower active mass density (e.g., g/cc) of the positive electrode when the activated carbon is included in a greater amount, it is hard to accomplish battery performance with a thin film, thereby deteriorating the rate capability at a high rate.

In addition, when the activated carbon is used with the positive active material in a ratio of the activated carbon to the positive active material in a range of about 2 wt %:98 wt % to about 40 wt %:60 wt % and the activated carbon has a smaller particle diameter than the positive active material, the activated carbon may be agglomerated in an electrode and unevenly distributed in a particular region thereof, causing a non-uniform input and output reaction, which is not desirable.

The positive electrode according to one embodiment of the present invention may further include a conductive material and a binder. For example, the positive electrode according to one embodiment of the present invention includes a positive active material, activated carbon, a conductive material, and a binder. In one embodiment, the positive active material, activated carbon, conductive material, and binder are present in a positive active material layer, which is formed on a current collector.

The positive active material may include a compound that reversibly intercalates and deintercalates lithium (lithiated intercalation compound). Specifically, a composite oxide of at least one of cobalt, manganese, nickel, or combination thereof, and lithium may be used.

Examples may be compounds represented by the following formulae:

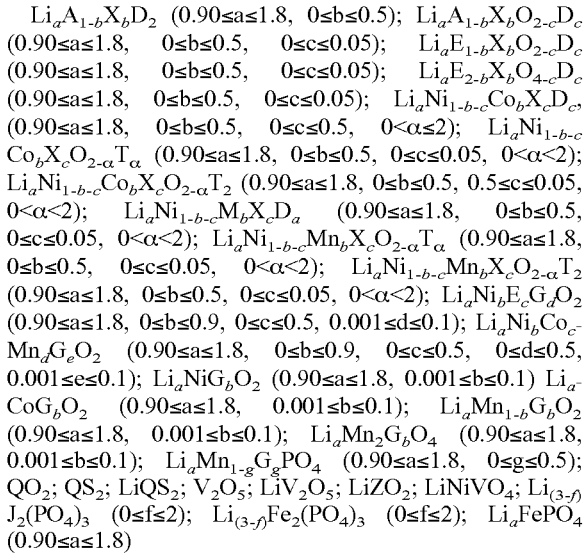

In the above formulae, A is selected from Ni, Co, Mn, and combinations thereof; X is selected from Al, Ni, Co, Mn, Cr, Fe, Mg, Sr, V, a rare earth element, and combinations thereof; D is selected from O, F, S, P, and combinations thereof; E is selected from Co, Mn, and combinations thereof T is selected from F, S, P, and combinations thereof; G is selected from Al, Cr, Mn, Fe, Mg, La, Ce, Sr, V, and combinations thereof; Q is selected from Ti, Mo, Mn, and combinations thereof; Z is selected from Cr, V, Fe, Sc, Y, and combinations thereof; and J is selected from V, Cr, Mn, Co, Ni, Cu, and combinations thereof.

The compounds may have a coating layer on the surface, or may be mixed with another compound having a coating layer. The coating layer may include at least one coating element compound selected from the group consisting of an oxide of the coating element, a hydroxide of the coating element, an oxyhydroxide of the coating element, an oxycarbonate of the coating element, and a hydroxyl carbonate of the coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be formed by any suitable method having no adverse influence on the properties of a positive active material by using these elements in the compound. For example, the method may include any suitable coating method such as spray coating, dipping, or the like, but it is not illustrated in more detail since it is well-known to those who work in the related field.

In the positive active material layer, a positive active material and activated carbon may be included in the positive active material layer in a range of about 85 wt % to about 98 wt % based on the total weight of the positive active material layer total. In particular, the positive active material and activated carbon may be mixed in a weight ratio in a range of about 98:2 to about 60:40 or about 94:6 to about 69:31 within the aforementioned range of about 85 wt % to about 98 wt %. In addition, the binder and conductive material may be respectively included in an amount in a range of about 1 to about 7.5 wt % based on the total weight of the positive active material layer.

The binder improves the binding properties of the positive active material particles to each other and to a current collector. Examples of the binder include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but the binder is not limited thereto.

The conductive material provides an electrode with conductivity (e.g., improved conductivity). Any suitable electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material such as metal powder or metal fiber including copper, nickel, aluminum, silver, and the like; a conductive polymer such as polyphenylene derivative, or a mixture thereof.

The current collector may be Al, but it is not limited thereto.

The positive electrode may be fabricated by a method including mixing an active material, a conductive material, and a binder in a solvent to prepare an active material composition, and coating the active material composition on a current collector. Examples of the solvent include N-methylpyrrolidone, and the like, but the solvent is not limited thereto.

According to another embodiment of the present invention, a battery including the positive electrode, a negative electrode including a negative active material and an electrolyte is provided.

The negative electrode includes a current collector and a negative active material layer on the current collector, and the negative active material layer includes the negative active material.

The negative active material includes a material that reversibly intercalates/deintercalates lithium ions, a lithium metal, a lithium metal alloy, a material being capable of doping/dedoping lithium, or a transition metal oxide.

The material that can reversibly intercalate/deintercalate lithium ions includes a carbon material. The carbon material may be any generally-used carbon-based negative active material in a lithium ion rechargeable battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, and the like.

Examples of the lithium metal alloy include lithium and an element selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may include Si, a Si—C composite, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition element, a rare earth element, and a combination thereof, and not Si), Sn, $SnO_2$, a Sn—R alloy (wherein R is an element selected from an alkali metal, an alkaline-earth metal, a Group 13 element, a Group 14 element, a Group 15 element, a Group 16 element, a transition element, a rare earth element, and a combination thereof, and not Sn), and the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal oxide includes vanadium oxide, lithium vanadium oxide, and the like.

In one embodiment of the present invention, the negative active material may be amorphous carbon. When a negative active material is amorphous carbon, lithium ions may be better intercalated and deintercalated than crystalline carbon, thereby improving rate capability.

In the negative active material layer, the negative active material may be included in an amount in a range of about 95 wt % to about 99 wt % based on the total weight of the negative active material layer.

The negative active material layer may include a binder, and, optionally, a conductive material. The negative active material layer may include about 1 to about 5 wt % of a binder based on the total weight of the negative active material layer. When the negative active material layer includes a conductive material, the negative active material layer includes about 90 wt % to about 98 wt % of the negative active material, about 1 wt % to about 5 wt % of the binder, and about 1 wt % to about 5 wt % of the conductive material.

The binder improves binding properties of negative active material particles of the negative active material with one another and with a current collector. The binder includes a non-water-soluble binder, a water-soluble binder, or a combination thereof.

The non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

When the water-soluble binder is used as the negative electrode binder, a cellulose-based compound may be further used to provide viscosity. The cellulose-based compound includes one or more of carboxylmethyl cellulose, hydroxypropylmethyl cellulose, methyl cellulose, or alkali metal salts thereof. The alkali metal may be Na, K, or Li. The cellulose-based compound may be included in an amount in a range of about 0.1 to about 3 parts by weight based on 100 parts by weight of the negative active material.

The conductive material is included to provide electrode conductivity (e.g., improved conductivity). Any suitable electrically conductive material may be used as a conductive material unless it causes a chemical change. Examples of the conductive material include carbon-based materials such as natural graphite, artificial graphite, carbon black, acetylene black, ketjen black, carbon fibers, and the like; metal-based materials of metal powder or metal fiber including copper, nickel, aluminum, silver, and the like; conductive polymers such as polyphenylene derivatives; or a mixture thereof.

The current collector may include one selected from a copper foil, a nickel foil, a stainless steel foil, a titanium foil, a nickel foam, a copper foam, a polymer substrate coated with a conductive metal, and a combination thereof, but it is not limited thereto.

In one embodiment, the electrolyte includes an organic solvent and a lithium salt.

The organic solvent serves as a medium of transmitting ions taking part in the electrochemical reaction of the battery and may be a non-aqueous organic solvent.

The organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like, and examples of the aprotic solvent include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The organic solvent may be used singularly or in a mixture. When the organic solvent is used in a mixture, the mixture ratio can be controlled in accordance with a desirable or suitable battery performance.

The carbonate-based solvent may include a mixture with a cyclic carbonate and a linear carbonate. In one embodiment, the cyclic carbonate and linear carbonate are mixed together in a volume ratio in a range of about 1:1 to about 1:9. When the mixture is used as an electrolyte, it may have enhanced performance.

In addition, the organic solvent according to one embodiment may further include an aromatic hydrocarbon-based solvent as well as the carbonate-based solvent. The carbonate-based solvents and aromatic hydrocarbon-based solvents may be mixed together in a volume ratio in a range of about 1:1 to about 30:1.

The aromatic hydrocarbon-based organic solvent may be an aromatic hydrocarbon-based compound represented by the following Chemical Formula 1.

[Chemical Formula 1]

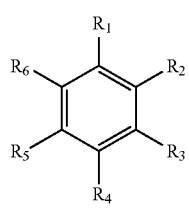

In the above Chemical Formula 1, $R_1$ to $R_6$ are independently hydrogen, a halogen, a C1 to C10 alkyl, a C1 to C10 haloalkyl, or a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound represented by the following Chemical Formula 2 to improve cycle life.

[Chemical Formula 2]

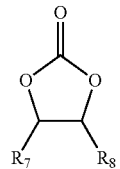

In the above Chemical Formula 2, $R_7$ and $R_8$ are the same or different and may be each independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the additive for improving cycle life may be flexibly used within an appropriate range.

The lithium salt is dissolved in an organic solvent, supplies a battery with lithium ions, basically operates the rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI and $LiB(C_2O_4)_2$ (lithium bis(oxalato) borate; LiBOB). The lithium salt may be used in a concentration in a range of about 0.1 M to about 2.0 M. In one embodiment, when the lithium salt is included at the above concentration range, an electrolyte has desirable or suitable electrolyte conductivity and viscosity, and thus has enhanced performance and effective lithium ion mobility.

The rechargeable lithium battery may further include a separator between the negative electrode and the positive electrode, depending on the kind of battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The accompanying drawing is a schematic view showing a representative structure of a rechargeable lithium battery according to one embodiment. As shown in the drawing, the rechargeable lithium battery 1 includes a positive electrode 2, a negative electrode 4, and a separator interposed between the positive electrode 2 and negative electrode 4, an electrolyte 3 immersed therein, a battery case 5, and a sealing member 6 sealing the battery case 5.

The following examples illustrate the invention in more detail. These examples, however, are not to be interpreted as limiting the scope of the invention.

Example 1

85 wt % of $LiCoO_2$ having an average particle diameter of 6.6 μm, 5 wt % of activated carbon having an average particle diameter of 6.8 μm (pitch-based, Kuraray Chemical Co.), 4 wt % of an acetylene black (Denka Chemicals Korea Co. Ltd.) conductive material, and 6 wt % of a polyvinylidene fluoride binder were mixed in an N-methylpyrrolidone solvent, preparing a positive active material slurry.

The positive active material slurry was coated on a 15 μm-thick Al foil, dried at 100° C., and compressed, fabricating a positive electrode having an active mass (positive active material layer) density of 2.6 g/cc.

Additionally, a negative active material slurry was prepared by mixing 85 wt % of a soft carbon (Hitachi Ltd.) negative active material having an average particle diameter of 10 μm, which was an amorphous carbon, 5 wt % of acetylene black (Denka Chemicals Korea Co. Ltd.), and 10 wt % of a polyvinylidene fluoride binder were mixed in an N-methylpyrrolidone solvent.

The negative active material slurry was coated on a 10 μm-thick Cu foil, dried at 100° C., and compressed, fabricating a negative electrode having an active mass (negative active material layer) density of 1.2 g/cc.

Then, a separator was interposed between the positive and negative electrodes and wound together into a cylindrical jelly roll. The separator was a 25 μm-thick V25CGD microporous film (including polyethylene and polypropylene).

The jelly roll was housed in a 18650 size battery case, and an electrolyte solution was injected therein, fabricating a rechargeable lithium battery. The electrolyte solution was prepared by mixing ethylene carbonate and ethylmethyl carbonate in a volume ratio of 3:7 and dissolving 1.0M $LiPF_6$ therein.

Example 2

A rechargeable lithium battery cell was fabricated according to the same method as Example 1 except for mixing 85 wt % of $LiCoO_2$ having an average particle diameter of 6.4 μm, 5 wt % of activated carbon (pitch-based, Kuraray Chemical Co.) having an average particle diameter of 6.65 μm, 4 wt % of an acetylene black (Denka Chemicals Korea Co. Ltd.) conductive material, and 6 wt % of a polyvinylidene fluoride binder in an N-methylpyrrolidone solvent to prepare a positive active material slurry.

Example 3

A rechargeable lithium battery cell was fabricated according to the same method as Example 1 except for mixing 85 wt % of $LiCoO_2$ having an average particle diameter of 6.6 μm, 5 wt % of activated carbon (pitch-based, Kuraray Chemical Co.) having an average particle diameter of 8.08 μm, 4 wt % of an acetylene black (Denka Chemicals Korea Co. Ltd.) conductive material, and 6 wt % of a polyvinylidene fluoride binder in an N-methylpyrrolidone solvent to prepare a positive active material slurry.

Example 4

A rechargeable lithium battery cell was fabricated according to the same method as Example 1 except for mixing 85 wt % of $LiCoO_2$ having an average particle diameter of 5 μm, 5 wt % of activated carbon (pitch-based, Kuraray Chemical Co.) having an average particle diameter of 6.65 μm, 4 wt % of an acetylene black (Denka Chemicals Korea Co. Ltd.) conductive material, and 6 wt % of a polyvinylidene fluoride binder in an N-methylpyrrolidone solvent to prepare a positive active material slurry.

Example 5

A rechargeable lithium battery cell was fabricated according to the same method as Example 1 except for mixing 85 wt % of $LiCoO_2$ having an average particle diameter of 5 μm, 5 wt % of activated carbon (pitch-based, Kuraray Chemical Co.) having an average particle diameter of 7 μm, 4 wt % of an acetylene black (Denka Chemicals Korea Co. Ltd.) conductive material, and 6 wt % of a polyvinylidene fluoride binder in an N-methylpyrrolidone solvent to prepare a positive active material slurry.

Example 6

A rechargeable lithium battery cell was fabricated according to the same method as Example 1 except for mixing 85 wt % of $LiCoO_2$ having an average particle diameter of 5 μm, 5 wt % of activated carbon (pitch-based, Kuraray Chemical Co.) having an average particle diameter of 8 μm, 4 wt % of an acetylene black (Denka Chemicals Korea Co. Ltd.) conductive material, and 6 wt % of a polyvinylidene fluoride binder in an N-methylpyrrolidone solvent to prepare a positive active material slurry.

Comparative Example 1

A rechargeable lithium battery cell was fabricated according to the same method as Example 1 except for mixing 85 wt % of $LiCoO_2$ having an average particle diameter of 5 μm, 5 wt % of activated carbon (pitch-based, Kuraray Chemical Co.) having an average particle diameter of 2 μm, 4 wt % of an acetylene black (Denka Chemicals Korea Co. Ltd.) conductive material, and 6 wt % of a polyvinylidene fluoride binder in an N-methylpyrrolidone solvent to prepare a positive active material slurry.

Comparative Example 2

A rechargeable lithium battery cell was fabricated according to the same method as Example 1 except for mixing 85 wt % of $LiCoO_2$ having an average particle diameter of 6.6 μm, 5 wt % of activated carbon (pitch-based, Kuraray Chemical Co.) having an average particle diameter of 3.85 μm, 4 wt % of an acetylene black (Denka Chemicals Korea Co. Ltd.) conductive material, and 6 wt % of a polyvinylidene fluoride binder in an N-methylpyrrolidone solvent to prepare a positive active material slurry.

Comparative Example 3

A rechargeable lithium battery cell was fabricated according to the same method as Example 1 wt % of LiCoO$_2$ having an average particle diameter of 5 μm, 5 wt % of activated carbon (pitch-based, Kuraray Chemical Co.) having an average particle diameter of 4 μm, 4 wt % of an acetylene black (Denka Chemicals Korea Co. Ltd.) conductive material, and 6 wt % of polyvinylidene fluoride binder in an N-methylpyrrolidone solvent to prepare a positive active material slurry.

Comparative Example 4

A rechargeable lithium battery was fabricated according to the same method as Example 1 except for mixing 85 wt % of LiCoO$_2$ having an average particle diameter of 3.5 μm, 5 wt % of activated carbon having an average particle diameter of 6.8 μm (pitch-based, Kuraray Chemical Co.), 4 wt % of an acetylene black (Denka Chemicals Korea Co. Ltd.) conductive material, and 6 wt % of a polyvinylidene fluoride binder in an N-methylpyrrolidone solvent to prepare a positive active material slurry and using hard carbon as a negative active material.

Comparative Example 5

A rechargeable lithium battery cell was fabricated according to the same method as Example 1 except for mixing 85 wt % of LiCoO$_2$ having an average particle diameter of 6.6 μm, 5 wt % of activated carbon having an average particle diameter of 13.49 μm (pitch-based, Kuraray Chemical Co.), 4 wt % of an acetylene black (Denka Chemicals Korea Co. Ltd.) conductive material, and 6 wt % of a polyvinylidene fluoride binder in an N-methylpyrrolidone solvent to prepare a positive active material slurry.

Comparative Example 6

A rechargeable lithium battery cell was fabricated according to the same method as Example 1 except for mixing 85 wt % of LiCoO$_2$ having an average particle diameter of 5 μm, 5 wt % of activated carbon (pitch-based, Kuraray Chemical Co.) having an average particle diameter of 14 μm, 4 wt % of an acetylene black (Denka Chemicals Korea Co. Ltd.) conductive material, and 6 wt % of a polyvinylidene fluoride binder in an N-methylpyrrolidone solvent to prepare positive active material slurry and using hard carbon to prepare a negative active material.

The rechargeable lithium battery cells according to Examples 1 to 6 and Comparative Examples 1 to 6 were constant current charged at a rate of 0.2 C up to a voltage of 4.2 V. Next, the rechargeable lithium batteries were constant current discharged at a rate of 0.2 C current to a voltage of 2.0 V. These charged and discharged batteries were measured for capacity. The measured capacity was regarded as initial capacity. The results are shown as 0.2 C capacity in the following Table 1.

Then, the rechargeable lithium battery cells after measuring initial capacity were constant current charged at a rate of 1 C up to a voltage of 4.2 V and discharged at a rate of 50 C down to 2.0 V. Herein, the rechargeable lithium batteries were measured for capacity and a 50 C/1 C (%) ratio of 50 C discharge capacity relative to 1 C charge capacity was calculated. The results are provided under a 50 C rate as a high rate discharge characteristic in the following Table 1.

In addition, the rechargeable lithium batteries after measuring the initial capacity were 1000 times repetitively charged at a rate of 30 C up to a voltage of 4.2 V and discharged at a rate of 30 C down to 2.0V and then, measured for retention capacity % of 1000$^{th}$ discharge capacity relative to initial capacity. The results are provided in the following Table 1.

In addition, the positive electrodes according to Examples 1 to 6 and Comparative Examples 1 to 6 were measured for electric conductivity using an electric conductivity measurement device (a resistance measurement equipment made available from CIS, Co. Ltd.). The results are provided in the following Table 1.

TABLE 1

| | Positive electrode | Negative electrode | Diameter of activated carbon/diameter of active material (%) | Conductivity of positive electrode (S/m) | 0.2 C capacity (mAh/g) | 50 C rate (50 C/1 C) | Remaining capacity %, 30 C/30 C cycle (1000$^{th}$/1$^{st}$ cycle, %) |
|---|---|---|---|---|---|---|---|
| Example 1 | LiCoO$_2$: 6.6 μm, 85 wt %  activated carbon: 6.8 μm, 5 wt % | amorphous carbon | 103 | 0.2 | 128 | 82% | 89 |
| Example 2 | LiCoO$_2$: 6.4 μm, 85 wt %  activated carbon: 6.65 μm, 5 wt % | amorphous carbon | 104 | 0.21 | 125 | 84% | 88 |
| Example 3 | LiCoO$_2$: 6.6 μm, 85 wt %  activated carbon: 8.08 μm, 5 wt % | amorphous carbon | 122 | 0.14 | 132 | 81% | 90 |
| Example 4 | LiCoO$_2$: 5 μm, 85 wt %  activated carbon: 6.65 μm, 5 wt % | amorphous carbon | 133 | 0.11 | 129 | 83% | 96 |
| Example 5 | LiCoO$_2$: 5 μm, 85 wt %  activated carbon: 7 μm, 5 wt % | amorphous carbon | 140 | 0.18 | 131 | 83% | 91 |
| Example 6 | LiCoO$_2$: 5 μm, 85 wt %  activated carbon: 8 μm, 5 wt % | amorphous carbon | 160 | 0.17 | 125 | 83% | 88 |
| Comparative Example 1 | LiCoO$_2$: 5 μm, 85 wt %  activated carbon: 2 μm, 5 wt % | amorphous carbon | 40 | 0.092 | 129 | 65% | 68 |
| Comparative Example 2 | LiCoO$_2$: 6.6 μm, 85 wt %  activated carbon: 3.85 μm, 5 wt % | amorphous carbon | 58 | 0.11 | 127 | 76% | 66 |
| Comparative Example 3 | LiCoO$_2$: 5 μm, 85 wt %  activated carbon: 4 μm, 5 wt % | amorphous carbon | 80 | 0.117 | 129 | 80% | 71 |
| Comparative Example 4 | LiCoO$_2$: 3.5 μm, 85 wt %  activated carbon: 6.8 μm, 5 wt % | amorphous carbon | 194 | 0.28 | 127 | 72% | 69 |
| Comparative Example 5 | LiCoO$_2$: 6.6 μm, 85 wt %  activated carbon: 13.49 μm, 5 wt % | amorphous carbon | 204 | 0.21 | 131 | 79% | 71 |

TABLE 1-continued

|  | Positive electrode | Negative electrode | Diameter of activated carbon/diameter of active material (%) | Conductivity of positive electrode (S/m) | 0.2 C capacity (mAh/g) | 50 C rate (50 C/1 C) | Remaining capacity %, 30 C/30 C cycle ($1000^{th}/1^{st}$ cycle, %) |
|---|---|---|---|---|---|---|---|
| Comparative Example 6 | $LiCoO_2$: 5 μm, 85 wt % activated carbon: 14 μm, 5 wt % | amorphous carbon | 280 | 0.158 | 130 | 80% | 71 |

As shown in Table 1, the rechargeable lithium batteries including the positive electrodes using activated carbon having an average particle diameter in a range of about 100% to about 160% based on 100% of the average particle diameter of the positive active material according to Examples 1 to 6 had better high rate characteristic (50 C rate) and retention capacity % than the ones including a positive electrode according to Comparative Examples 1 to 6, each of which included activated carbon having an average particle diameter either smaller than 100% or larger than 160% based on 100% of the average particle diameter of the positive active material.

Based on the result, the positive electrode including activated carbon having an average particle diameter in a range of about 100% to about 160% relative to 100% of the average particle diameter of a positive active material may provide a rechargeable lithium battery having excellent high power and cycle life characteristics.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A positive electrode for a rechargeable lithium battery, comprising:
   a positive active material consisting of $LiCoO_2$ or $Li_aCoG_bO_2$ (0.90≤a≤1.8, 0.001≤b≤0.1, G is Al, Cr, Mn, Fe, Mg, La, Ce, Sr, V, or a combination thereof); and
   activated carbon having an average particle diameter larger than an average particle diameter of the positive active material and in a range of about 122% to about 160% relative to 100% of the average particle diameter of the positive active material,
   wherein the positive active material and activated carbon are present in a mixed ratio in a range of about 98:2 to about 94:6.

2. The positive electrode for a rechargeable lithium battery of claim 1, wherein the average particle diameter of the activated carbon is in a range of about 133% to about 140% relative to 100% of the average particle diameter of the positive active material.

3. The positive electrode for a rechargeable lithium battery of claim 1, wherein the average particle diameter of the activated carbon is in a range of about 1 μm to about 32 μm.

4. The positive electrode for a rechargeable lithium battery of claim 1, wherein the average particle diameter of the activated carbon is in a range of about 1 μm to about 30 μm.

5. The positive electrode for a rechargeable lithium battery of claim 1, wherein the positive electrode further comprises a conductive material and a binder.

6. A rechargeable lithium battery, comprising:
   a positive electrode comprising a positive active material consisting of $LiCoO_2$ or $Li_aCoG_bO_2$ (0.90≤a≤1.8, 0.001≤b≤0.1, G is Al, Cr, Mn, Fe, Mg, La, Ce, Sr, V, or a combination thereof) and activated carbon having an average particle diameter larger than an average particle diameter of the positive active material and in a range of about 122% to about 160% relative to 100% of the average particle diameter of the positive active material;
   a negative electrode including a negative active material; and
   an electrolyte including an organic solvent and a lithium salt,
   wherein the positive active material and activated carbon are present in a mixed ratio in a range of about 98:2 to about 94:6.

7. The rechargeable lithium battery of claim 6, wherein the negative active material is amorphous carbon.

8. The rechargeable lithium battery of claim 6, wherein the average particle diameter of the activated carbon is in a range of about 133% to about 140% relative to 100% of the average particle diameter of the positive active material.

9. The rechargeable lithium battery of claim 6, wherein the average particle diameter of the activated carbon is in a range of about 1 μm to about 32 μm.

10. The rechargeable lithium battery of claim 6, wherein the average particle diameter of the activated carbon is in a range of about 1 μm to about 30 μm.

11. The rechargeable lithium battery of claim 6, wherein the positive electrode further comprises a conductive material and a binder.

12. The rechargeable lithium battery of claim 1, wherein the positive active material consists of $LiCoO_2$.

13. The rechargeable lithium battery of claim 6, wherein the positive active material consists of $LiCoO_2$.

14. The positive electrode for a rechargeable lithium battery of claim 1, wherein the average particle diameter of the activated carbon is 6.65 μm to 8.08 μm.

15. The rechargeable lithium battery of claim 6, wherein the average particle diameter of the activated carbon being 6.65 μm to 8.08 μm.

* * * * *